Aug. 4, 1964   R. E. ROESLING   3,142,957
ENGINE SUPERCHARGING APPARATUS
Filed Feb. 19, 1962   4 Sheets-Sheet 1
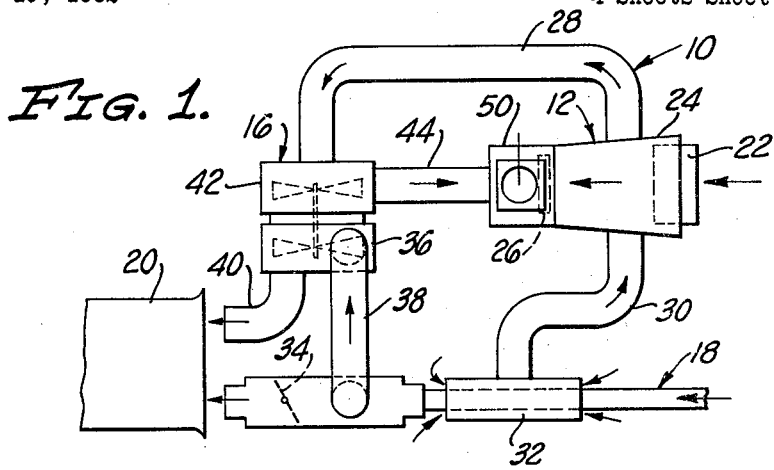
FIG. 1.
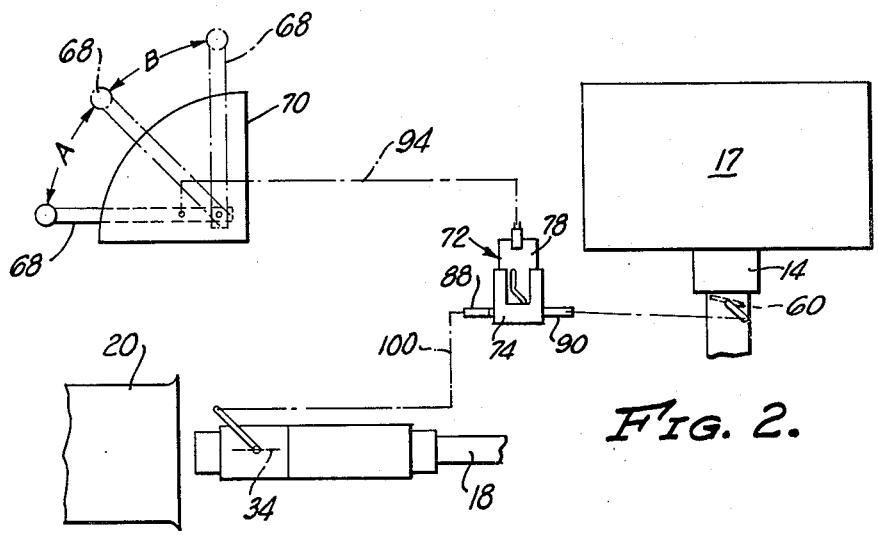
FIG. 2.
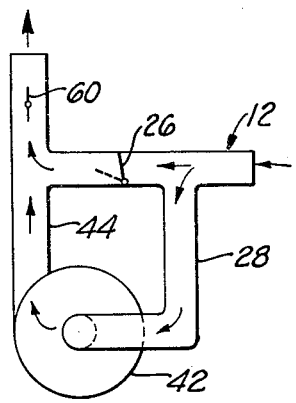
FIG. 3.
INVENTOR.
RAYMOND E. ROESLING
BY
ATTORNEY

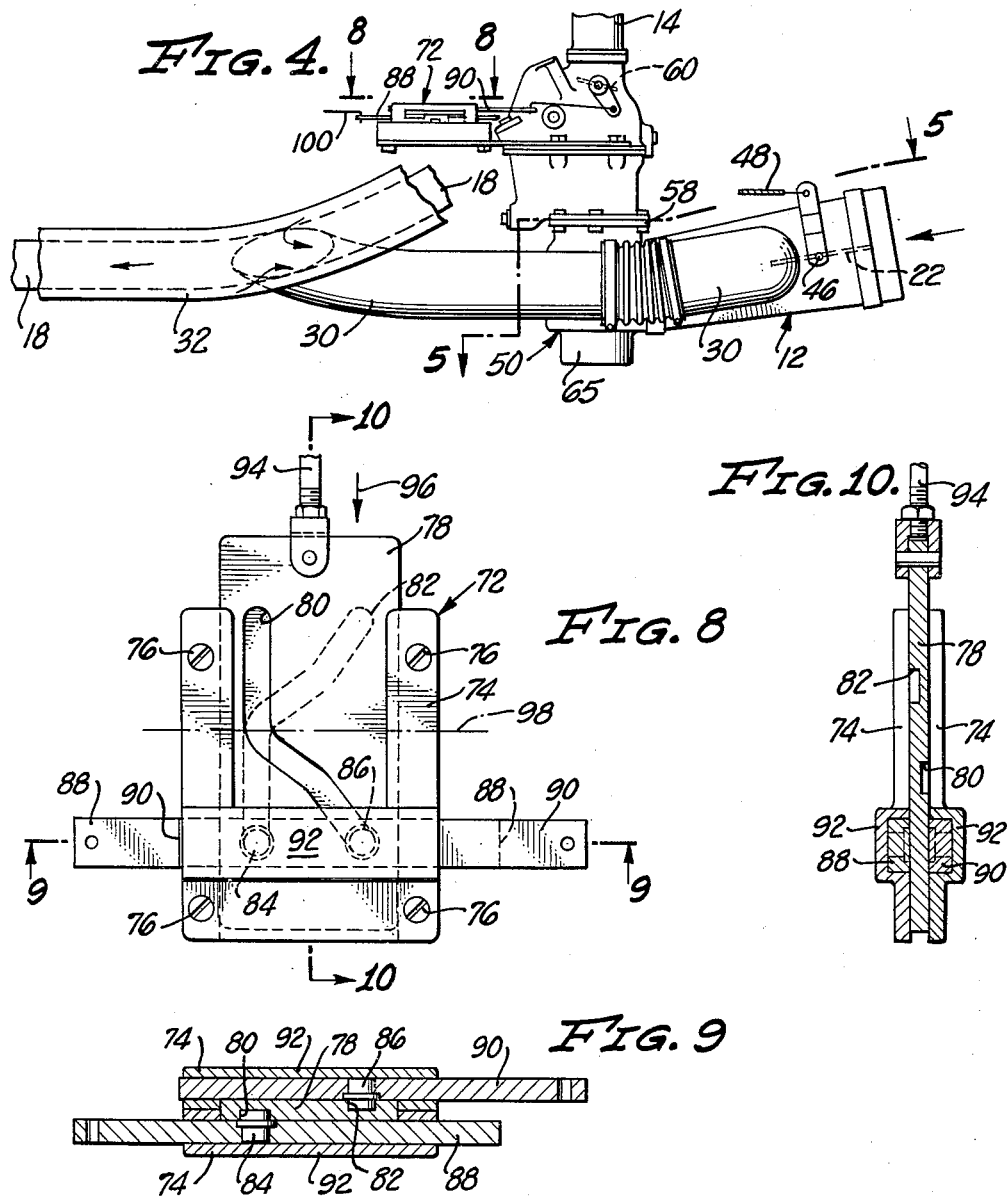

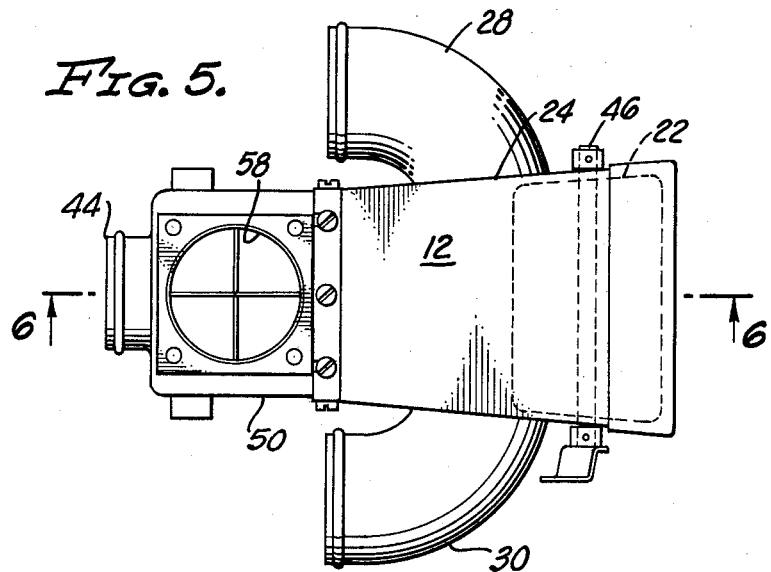
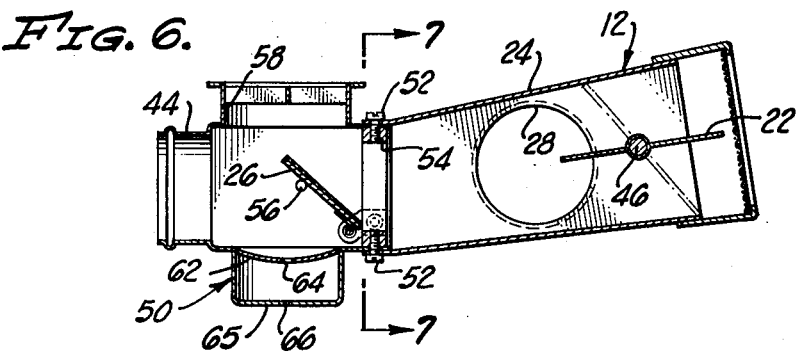
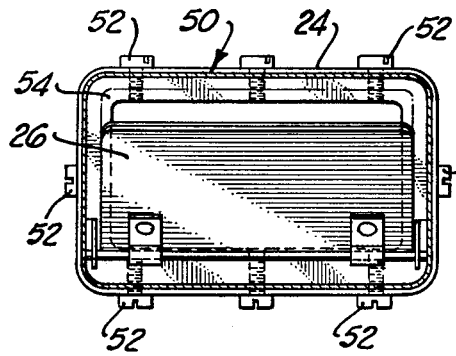

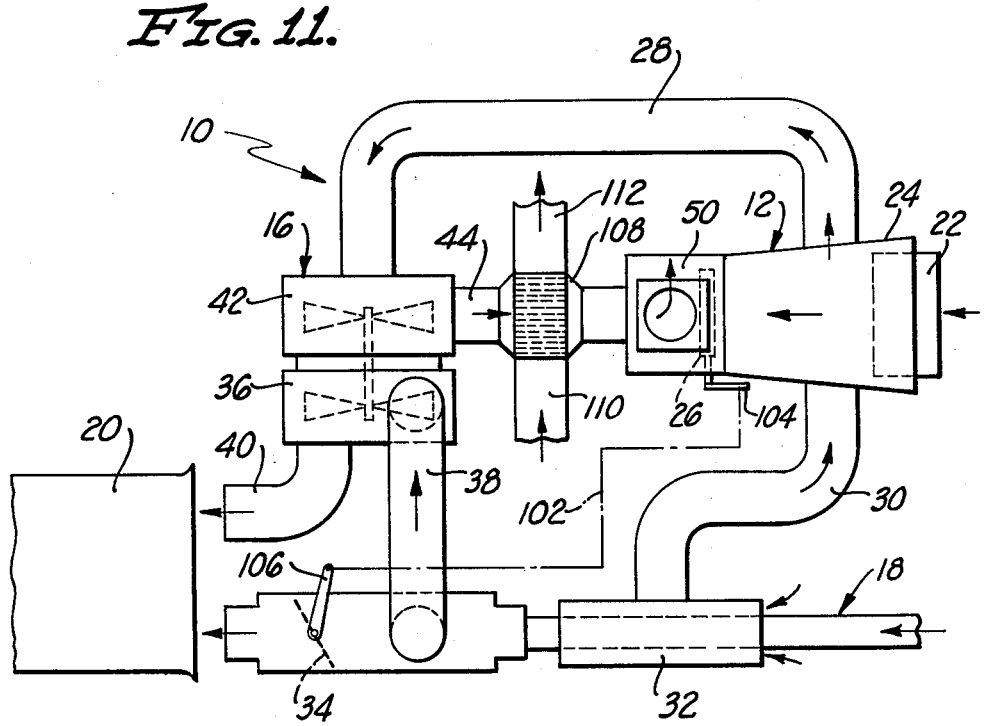

United States Patent Office 3,142,957
Patented Aug. 4, 1964

3,142,957
ENGINE SUPERCHARGING APPARATUS
Raymond E. Roesling, Long Beach, Calif., assignor, by mesne assignments, to Jack M. Riley, Fort Lauderdale, Fla.
Filed Feb. 19, 1962, Ser. No. 176,481
1 Claim. (Cl. 60—13)

The present invention relates to engine supercharging apparatus and more particularly to apparatus for controlling the flow of engine inlet air through a supercharger.

This application is a continuation-in-part of my copending application, Serial No. 140,489, filed September 25, 1961, now abandoned.

The power output of internal combustion engines which obtain all air through natural aspiration is substantially reduced at higher altitudes because of the reduced air density and various supercharging arrangements have been proposed in the prior art to provide the requisite air for efficient engine operation. One well-known arrangement employs a turbosupercharger which utilizes normally wasted exhaust gases to drive a turbine coupled to a compressor. However, in this system of the prior art the inlet air for the engine is always channeled through the compressor, regardless of the aircraft altitude or the power requirement resulting in undesirable induction inlet drag and consequently in poor engine efficiency, particularly at the lower altitudes where often it is not desired to use the supercharger.

Accordingly, it is an object of the present invention to provide engine supercharging apparatus which employs a supercharger disassociatable from the flow of engine inlet air until the engine has reached the point where it is producing all the power of which it is capable through the use of naturally aspirated air. Only at that time does the supercharger become operative, and only then does engine inlet air flow through the supercharger. The apparatus is highly useful in providing an augmented air supply to most, if not all, types of internal combustion engines, including aircraft, automobile, and truck engines, and is therefore not limited to aircraft engines, with which it is herein described merely by way of example.

Another object of the invention is to provide apparatus of the character described which includes a turbosupercharger operative upon actuation of a waste gate, and wherein the compressed air output of the turbosupercharger is applied or delivered to the engine inlet air ducting downstream of a check valve which may be manually closed, but which is preferably positioned for automatic closure by the increased pressure developed upon operation of the turbosupercharger. The check valve, in its closed position, prevents naturally aspirated or ram air from flowing directly into the engine, and instead routes such air to the supercharger. In the preferred automatic system the valve is free to move either open or closed, depending upon the pressure differential across it, that is, it is opened by the rush of incoming ambient air when the supercharger is not operating, and is closed by the flow of supercharger air when the pressure thereof reaches a level greater than that of the incoming ambient air.

Automatic operation of the check valve is preferred since this has the important advantage of permitting the check valve to automatically open and admit ambient air if the supercharger should malfunction for any reason, thus preventing either a complete or substantial loss of engine power. An important aspect of the invention is that the presence of the turbosupercharger does not impose a pressure drop on the inlet air system, since incoming air does not flow through the turbosupercharger until the turbosupercharger is operated and the check valve closed to route incoming air to the turbosupercharger inlet. In those applications where an intercooler is interposed between the turbosupercharger and the engine, it will be apparent that the inlet system will not be penalized by any intercooler drag either until the turbosupercharger is operated.

Another object of the invention is the provision of apparatus of the character described which includes an engine throttle movable through a first sector to operate the usual throttle valve at the carburetor or other fuel metering means, and movable through a second sector to additionally move a waste gate for operating a turbosupercharger. Thus, the turbosupercharger is engaged or disengaged from the engine inlet system through the use of the existing engine throttle, the first sector travel of the throttle operating the engine from idle power to full, naturally aspirated power. Second sector travel additionally operates the turbosupercharger to provide additional power over and above that which the engine is capable of providing by natural air aspiration. Thus, the throttle is operative to perform its usual function of controlling the carburetor throttle valve, and is additionally operative to control the turbosupercharger output.

A further object of the invention is to provide apparatus of the character described in which engine fuel metering means, such as a carburetor, is controlled by a throttle valve coupled to the engine throttle, and in which the supercharger is is controlled by a waste gate coupled to the throttle, the coupling for both the throttle valve and the waste gate being by means of a cam system which operates the waste gate only after the throttle valve has been operated or moved to its full-open position. Therefore, the engine must be operating at full power, using naturally aspirated air, before the supercharger is cut in or operated.

A further object of the invention is to provide apparatus of the character described which includes a check valve in the engine inlet air ducting which is operative either to allow naturally aspirated air, including "ram air," to flow directly into the engine, or to channel such air through a compressor and thereafter to the engine. Such alternate flow is dependent upon whether or not operation of the supercharger compressor has been initiated by movement of a waste gate valve, and the waste gate valve is coupled to the check valve so that closing movement of one results in a corresponding closing movement of the other, one of the valves being manually operative.

A further object of the invention is to provide apparatus of the character described which includes a check valve in the engine inlet air ducting which is operative either to allow naturally aspirated or ram air to flow directly to the engine, or to channel such air through a compressor and thereafter to the engine, dependent upon whether or not the supercharger compressor is being operated, and wherein the apparatus is adapted to accept heated air instead of ram air or naturally aspirated ambient air for transmission either directly to the engine or to the engine via the compressor, dependent upon the position of the check valve.

A further object of the invention is to provide apparatus of the character described which is adapted to be relatively quickly and inexpensively installed in existing aircraft to adapt such aircraft for flight at higher altitudes, with a minimum of rework or modification of the aircraft to accept such an installation.

Other objects and features of the invention will become apparent from consideration of the following description taken in connection with the accompanying drawings, in which:

FIG. 1 is a diagrammatic view of the engine supercharging apparatus of the present invention, various portions of the engine and carburetor being omitted for simplicity.

FIG. 2 is a diagrammatic view illustrating the control means operated by the engine throttle to selectively alter the positions of the throttle valve and the waste gate;

FIG. 3 is a diagrammatic view of the turbocompressor of the invention, particularly showing the relative location of the check valve and its associated ducting;

FIG. 4 is a side elevational view of the carburetor, the inlet air ducting and its associated alternate air valve, the exhaust gas ducting and its associated waste gate, and the control means which is operative to move both the waste gate and the throttle valve;

FIG. 5 is a view taken along the line 5—5 of FIG. 4;
FIG. 6 is a view taken along the line 6—6 of FIG. 5;
FIG. 7 is a view taken along the line 7—7 of FIG. 6;
FIG. 8 is a view taken along the line 8—8 of FIG. 4;
FIG. 9 is a view taken along the line 9—9 of FIG. 8;
FIG. 10 is a view taken along the line 10—10 of FIG. 8; and FIG. 11 is a diagrammatic view identical to FIG. 1, but showing an alternative embodiment in which an intercooler is associated with the turbocompressor and the check valve is coupled to the waste gate valve.

Referring now to the drawings, and particularly to FIGS. 1 through 3 thereof, there is illustrated an engine supercharging apparatus, generally designated 10, which includes an engine inlet air ducting 12 open to ambient air at its forward extremity and extending rearwardly and then upwardly to a fuel metering means or carburetor 14 as best illustrated in FIG. 2.

Apparatus 10 further includes a turbosupercharger 16 for supplying compressed air to a usual internal combustion aircraft engine 17 which dumps its exhaust products through an engine exhaust gas ducting 18 to an augmentor 20, the augmentor 20 being merely exemplary since the exhaust products could as well be dumped into a muffler or directly into the atmosphere.

Incoming air for the engine 17, which includes both ram air and air pulled into the engine 17 by natural aspiration, passes past a normally open alternate air valve 22 carried within the forward or upstream end of the inlet ducting 12 and proceeds into an enlarged, substantially rectangular portion of the inlet ducting 12 constituting a carburetor box 24. The incoming air is routed to the supercharger 16 through a compressor inlet conduit 28, and when the check valve 26 is open, the air passes directly to the engine 17.

In addition to incoming ram and naturally aspirated ambient air, the carburetor box 24 also receives heated air through a heated air conduit 30 connected to a usual cylindrical heat muff 32 which is disposed in heat exchange relationship about a portion of the exhaust ducting 18, the magnitude of flow of the heated air depending upon the degree of closure of the alternate air valve 22. Complete closure of the alternate air valve 22 blocks all flow of ram and naturally aspirated ambient air, and the natural aspiration of the engine 17 then pulls heated air through the conduit 30. Thus, during icing conditions for example, the alternate air valve 22 may be partially or completely closed to draw heated air through the conduit 30 to prevent icing of the carburetor, the air to be heated passing through the open, upstream end of the heat muff 32 through the conduit 30. The amount of heated air thus drawn into the engine 17 is controlled by the pilot through controls which are connected to the alternate air valve 22, a description of these controls being made in greater detail hereinafter.

When the supply of ram or naturally aspirated air is insufficient to provide the necessary or desired power output, an augmented supply of air is provided by the turbosupercharger 16, which is operated by a normally open waste gate 34 movable within the exhaust ducting 18 toward a closed position to shunt or channel a controlled quantity of exhaust gases to a turbine 36 of the turbosupercharger 16. More particularly, as the waste gate 34 is moved toward its closed position, more and more normally wasted engine exhaust gases are routed through a turbine inlet conduit 38 which is connected between the exhaust ducting 18 and the turbine 36. From the turbine 36 the spent exhaust gases are dumped overboard into the augmentor 20 through a turbine exhaust conduit 40 which is connected to the discharge side of the turbine 36.

The turbine 36 is coupled to a turbosupercharger compressor 42 which, when operated by the turbine 36, draws air in through the conduit 28 and discharges compressed air through a compressor discharge conduit 44 which is connected to the carburetor box 24 at the downstream side of the check valve 26. Thus, the conduit 44 delivers compressed air from the turbosupercharger 16 to the inlet ducting 12 at a point between the locations of the check valve 26 and the carburetor 14 to thereby provide boost pressure over and above that normal pressure which is produced by ram air or natural engine aspiration. This point of delivery of compressed air from the turbosupercharger 16 is critical to the embodiment of FIG. 1, which includes the automatically operative check valve 26, since the compressed air pressure must be on the downstream side of the normally open check valve 26 to close it whenever the boost pressure of the compressed air passing through the conduit 44 is in excess of the normal pressure of the ram or naturally aspirated air operating against the opposite or upstream side of the check valve 26.

Incoming ram air normally acts against the upstream side of the check valve 26 to force it open and deliver ram air to the engine 17. However, when the waste gate 34 is moved toward its closed position, some or all of the engine exhaust gases are shunted through the conduit 38 to operate the turbosupercharger 16, discharging compressed air through the conduit 44 and against the downstream side of the check valve 26. The boost pressure of this compressed air closes the check valve 26 when it is in excess of the pressure of the normally aspirated or ram air, so that in the embodiment of FIG. 1 incoming ram or aspirated air never flows into the turbosupercharger 16 until the turbosupercharger 16 is deliberately operated by the pilot through movement of the waste gate 34. Thus, the turbosupercharger 16 offers no drag when inoperative, and therefore does not impair the efficiency or the naturally aspirated power of the engine 17.

Upon closure of the alternate air valve 22, heated air flowing from the conduit 30 is also compressible by the compressor 42, such heated air passing to the compressor 42 via the conduit 28. In this way the present apparatus 10 is adapted to provide incoming ambient, uncompressed air to the engine when the alternate air valve 22 is open, or heated, uncompressed air when the alternate air valve 22 is moved toward its closed position, or compressed air when the waste gate 34 is moved toward its closed position, or heated and compressed air when both the waste gate 34 and the alternate air valve 22 are moved toward their closed positions.

The carburetor air inlet box 24, as best illustrated in FIGS. 5 through 7, is constituted by a substantially rectangular, open-ended body which rotatably mounts a transversely disposed control rod 46 adjacent its upstream extremity. The control rod 46 is rigidly secured to the alternate air valve 22 for rotation therewith, the rod 46 being rotatable by a control line or flexible cable 48, FIG. 4, which extends into the pilot's compartment for actuation.

The alternate air valve 22 is of the butterfly type and completely blocks the upstream extremity of the carburetor box 24 when it is in the closed position illustrated in phantom outline in FIG. 6. The downstream extremity of the carburetor box 24, which is occluded or blocked off by the check valve 26 in its closed position, is rigidly secured to a substantially rectangular carburetor inlet section 50 of the carburetor box 24 by a plurality of bolts 52 which is disposed through the carburetor section 50 and through a coupling ring 54 to which the check valve 26 is pivotally mounted.

The check valve 26 is movable between a closed position which completely blocks the downstream extremity of the carburetor box 24 to the open position illustrated in FIG. 6. In this open position the check valve 26 is engaged by a stop 56 secured to one of the side walls of the inlet section 50. The stop 56 insures that the check valve 26 is maintained in a position for closure by the rush of compressed air which flows through the conduit 44 when the turbosupercharger 16 is operated.

The carburetor section 50 includes an integral, upwardly extending conduit portion 58 which connects with other ducting (not shown) leading to the carburetor 14 and a throttle valve 60 is pivotally mounted in this ducting, as illustrated schematically in FIG. 2, for controlling the quantity of air passing therethrough to the carburetor 14.

To drain excess priming fuel from the carburetor 14, the carburetor section 50 is provided with a shielding basin 62 having a plurality of apertures 64. The excess fuel is caught in a shielded catch basin 65, and a small drain hole 66 in the basin 65 permits fuel caught in the catch basin 65 to be disposed of overboard, the drain hole 66 being large enough to permit such drainage, but small relative to the total air flow through the inlet system so that only a slight manifold air pressure loss is suffered.

The waste gate 34, operative to control the turbosupercharger 16, and the throttle valve 60, operative to control the air flow to the engine 17, are both actuated by movement of a usual throttle lever 68 which is pivotally mounted to a throttle quadrant 70, as best illustrated in FIG. 2. The throttle quadrant is divided into two sectors of pivotal movement, A and B, movement of the throttle lever 68 through sector A effecting the usual control of the power output of the engine 17 by moving throttle valve 60. Movement of the throttle lever 68 into the B sector additionally controls movement of the waste gate 34 to thereby control the operation of the turbosupercharger 16, a ball detent or the like (not shown) being employed, if desired, to indicate to the pilot when he has moved the throttle lever 68 from the A sector to the B sector. With this arrangement, the throttle lever 68 provides a single control to adjust the normal air requirements to the engine 17, and also the boost pressure required at the higher altitudes.

The control means for initially moving throttle valve 60, without causing movement of the waste gate 34, and then moving the waste gate 34 without further movement of the throttle valve 60 is best illustrated in FIGS. 2 and 8, through 10. The control means includes a cam assembly 72 which is constituted by a pair of U shaped side sections 74 secured together by a plurality of machine screws 76 and including recessed tracks for longitudinally and slidably receiving the edges of an elongated cam body 78. The opposite faces of the cam body 78 are provided with a pair of grooves 80 and 82, the groove 80 extending axially or longitudinally to approximately the mid-portion of the cam body 78, and thereafter angling downwardly and to the right, as viewed in FIG. 8. The other groove 82 in the opposite face of the cam body 78 extends longitudinally or axially upwardly to approximately the mid-portion of the cam body 78, in alignment with the axial portion of the groove 80, and thereafter extends diagonally to the right.

A pair of pins 84 and 86 are adapted to slidably move within the grooves 80 and 82, respectively, and are held within openings provided therefor in a pair of control elements 88 and 90, respectively. The elements 88 and 90 are slidably carried within opposed cheeks 92 integral with the side sections 74, the control elements 88 and 90 moving transversely or normally of the direction of slidable movement of the cam body 78.

The control means just described is operated by the pilot through the throttle lever 68. More particularly, movement of the throttle lever 68 through sector A is transmitted by any usual flexible cable linkage 94 to the cam body 78, which is moved in the direction of the arrow 96 in FIG. 8. This movement of the cam body 78 causes the pin 84 to slide in the straight portion of the groove 82, effecting no change in the position of the control element 88 which is associated with the pin 84. However, during this movement of the throttle lever through sector A, the pin 86 is moved through the diagonal portion of the groove 80, causing its associated control element 90 to be moved to the left, as viewed in FIG. 9, which in turn opens the throttle valve 60. Continued movement of the throttle lever 68 toward sector B opens the throttle valve 60, gradually increasing the power output of the engine. When the throttle reaches sector B, the pins 84 and 86 are located in the mid-portion of the respective grooves 80 and 82, as schematically indicated by the "dash-dot" line 98 in FIG. 8. Thereafter, movement of the throttle lever 68 through sector B continues to move the cam body 78 downwardly and the pin 86 then moves through the longitudinal or staight portion of its groove 80, and no movement therefore occurs in its associated control element 90. In contrast, the pin 84 at this time passes through the diagonal portion of its groove 82, and causes its associated control element 88 to be moved to the right, as viewed in FIG. 9, which through any suitable control linkage 100, FIG. 2, moves the waste gate 34 toward its closed position.

From the foregoing it will be apparent that the present apparatus 10 is operated by first moving the throttle control lever 68 through sector A to regulate the quantity of ram or naturally aspirated air passing through the alternate air valve 22 to the engine 17, and when power is required over and above that which is attainable through the use of naturally aspirated or ram air, then moving the throttle control lever 68 through sector B to actuate the waste gate 34 toward its closed position.

As the waste gate 34 is closed, the turbosupercharger 16 provides compressed air through the compressor discharge conduit 44, the rush of compressed air causing the check valve 26 to close. Closure of the check valve 26 shunts incoming air to the inlet side of the compressor 42, and the valve 26 remains closed as long as the boost pressure is more than the normal ram or naturally aspirated air pressure.

As the power demands on the engine 17 are reduced, the throttle lever 68 is moved back through sector B and into sector A, rendering the turbosupercharger 16 inoperative and placing the engine 17 under the control of the throttle valve 60.

The embodiment just described provides a mounting arrangement for the check valve 26 which permits automatic operation thereof by the flow of air resulting from the existence of a pressure differential on opposite sides thereof.

In FIG. 11, there is schematically illustrated an engine supercharging apparatus 10 which includes a coupling means between the check valve 26 and the waste gate 34, this coupling means being constituted by an elongated linkage 102 connected at one extremity to an arm 104 forming a part of the check valve 26, and at the other extremity to an arm 106 forming a part of the waste gate 34. The linkage 102, and the arms 104 and 106 are arranged so that opening or closing of either the check valve 26 or the waste gate 34 effects a corresponding opening or closing of the other. Thus, when the throttle lever 68 is operated to manually close the waste gate 34, through the cam assembly 72, the check valve 26 will also be manually closed through the linkage 102. With this arrangement, when the turbosupercharger 16 is operated, the check valve 26 will be closed to route the output of the compressor 42 to the engine. Similarly, when the waste gate 34 is manually opened by the throttle lever 68, the check valve 26 is also manually opened through the linkage 102 to admit ram air into the engine.

It will be apparent that where manual operation of the check valve 26 is desired, the arrangement just described is merely exemplary and other means may be provided, such as a separate control altogether for manually operating only the check valve 26, or by coupling the check valve 26 to any other element of the aircraft which is manually operated and characterized by movement at a time that movement is desired of the check valve 26.

A heat exchanger or intercooler 108, which may be of any conventional form for cooling the compressor discharge air, is also illustrated in FIG. 11 to demonstrate that the concept of connecting the turbocompressor discharge to the engine inlet air ducting downstream of the check valve 26 permits the use of an intercooler 108 between that point and the turbosupercharger 16 without incurring intercooler drag, unless the turbosupercharger 16 is operating. That is, ram or naturally aspirated air does not have to flow through the intercooler 108 when the turbosupercharger 16 is not operating since opening of the check valve 26 effectively routes such air past the check valve 26 directly to the engine.

When the turbosupercharger 16 is operating, and the check valve 26 is closed, the compressor discharge air must first pass through the intercooler 108 before it passes into the engine, so that such discharge air may be cooled by the circulation of cooler ambient air passing through the intercooler 108 via an inlet duct 110 interposed in the air stream and an outlet duct 112. The air is thus cooled, desirably increasing its density and the mass flow to the engine, and reducing the heat input to the engine so that the cylinder head operating temperatures are desirably reduced.

Thus, there has been described an engine supercharging apparatus which is adapted to control the flow of engine inlet air through a supercharger, channeling the inlet air directly to the engine under normal conditions, and, when boost pressure is needed, channeling the inlet air to a turbocompressor with or without initial heating. The air is channeled into one or the other of these paths by a check valve which is either manually operated or automatically operated by the differential pressures produced at boost and at normal aspiration. In this way, the check valve can be operated to block the flow of inlet air through the compressor until the turbosupercharger is operating.

While the invention has been described by means of specific examples and specific embodiments, the invention is not limited thereto since obvious modifications and variations will occur to those skilled in the art without departing from the spirit and scope of the invention as defined by the appended claim.

I claim:

In engine supercharging apparatus having engine fuel metering means, a throttle valve for controlling the operation of said metering means, and an engine exhaust gas waste gate movable to divert exhaust gas to a turbosupercharger for operation thereof to provide compressed air to the engine, the combination of: a throttle sequentially movable through a first sector and a second sector for increasing the engine output, and movable back through said second sector and then said first sector for decreasing the engine output; and control means for moving only said throttle valve upon movement of said throttle through said first sector, and for moving only said waste gate upon movement of said throttle through said second sector, said control means including a longitudinally movable cam body having a first groove extending longitudinally in one direction and thence diagonally and a second groove extending longitudinally in a direction opposite to said first direction and thence diagonally, a throttle valve control element and a waste gate control element movable along axes normal to the axis of movement of said cam body, and a pair of pins carried by said valve control element and said gate element control, and slidable in said second and said first grooves, respectively, whereby movement of said cam body in response to movement of said throttle through said first sector moves one of said pins through the longitudinal portion of said first groove and the other of said pins through the diagonal portion of said second groove to operate only said throttle valve, and whereby movement of said cam body in response to movement of said throttle through said second sector moves said one of said pins through the diagonal portion of said first groove and said other of said pins through the longitudinal portion of said second groove to operate only said waste gate.

References Cited in the file of this patent

UNITED STATES PATENTS

| | | |
|---|---|---|
| 1,941,642 | Vincent | Jan. 2, 1934 |
| 2,024,202 | Berger | Dec. 17, 1935 |
| 2,355,759 | Stokes | Aug. 15, 1944 |
| 2,579,643 | Baak | Dec. 25, 1951 |
| 2,622,391 | Lindeman | Dec. 23, 1952 |
| 2,645,409 | Lawler | July 14, 1953 |
| 2,896,598 | Reggio | July 28, 1959 |
| 2,897,801 | Kloss | Aug. 4, 1959 |
| 3,049,865 | Drayer | Aug. 21, 1962 |

FOREIGN PATENTS

| | | |
|---|---|---|
| 575,989 | Great Britain | Mar. 14, 1946 |